United States Patent [19]

Strand

[11] Patent Number: 5,079,417

[45] Date of Patent: Jan. 7, 1992

[54] FAILSAFE SENSING EDGE FOR AUTOMATIC DOORS AND GATES

[75] Inventor: Charles G. Strand, Melville, N.Y. N.Y.

[73] Assignee: Link Controls, Inc., Ronkonkoma, N.Y.

[21] Appl. No.: 658,816

[22] Filed: Feb. 22, 1991

[51] Int. Cl.$^5$ ............................................. E05F 15/20
[52] U.S. Cl. .................... 250/221; 250/222.1; 49/26; 49/27
[58] Field of Search ................. 250/221, 222.1; 49/25, 49/26, 27, 28

[56] References Cited

U.S. PATENT DOCUMENTS

| | | | |
|---|---|---|---|
| 3,001,038 | 9/1961 | Gessell | 49/27 |
| 3,003,303 | 2/1967 | Miller | 49/27 |
| 3,462,885 | 8/1969 | Miller | 49/27 |
| 4,115,952 | 9/1978 | French | 49/26 |
| 4,452,009 | 6/1984 | Baumeler et al. | 49/28 |
| 4,773,183 | 9/1988 | Okushima et al. | 49/28 |
| 4,944,116 | 7/1990 | Mewald | 49/28 |
| 4,953,608 | 9/1990 | Larsson | 49/28 |

Primary Examiner—Carolyn E. Fields
Attorney, Agent, or Firm—Leonard Belkin

[57] ABSTRACT

A failsafe or self-monitoring sensing edge for an overhead door comprising a channel mounted on the bottom edge of the door having a pair of downwardly extending arms which are spaced. An outer covering of soft material is attached to said channel for enclosing the arms. The covering supports within a rigid member extending upwardly through said arms terminating in an actuating member. On one end of the channel is a light source and the other end is a photoswitch. When the covering is depressed upwardly as a result of an obstacle in the path of the door, the actuating member blocks the light beam and the photoswitch gives off a signal which can be used to terminate or reverse motion of the door.

11 Claims, 3 Drawing Sheets

FAILSAFE SENSING EDGE FOR AUTOMATIC DOORS AND GATES

BACKGROUND OF THE INVENTION

The present invention relates to a failsafe sensing edge for use with automatic doors and gates.

The use of safety devices on automatically operating doors and gates is well known. In a usual such arrangement, for example, the door will automatically retract when an object interferes with its closing. The accepted meaning of "failsafe" in the industry is self-monitoring.

Typical designs for accomplishing this result include the use of lights with photoelectric detectors and switches which close on contact with the interfering object.

The drawbacks of arrangements currently in use include problems caused by the presence of dust, dirt, and ambient lighting in photoelectric systems, and problems with humidity and moisture in the case of switches mounted in sealed electrical door edges.

A variety of United States Patents have issued which disclose such safety devices.

U.S. Pat. No. 2,791,654 discloses a combined safe edge and sight guard for elevator doors using a micro switch which is closed when a cushioned edge is depressed by an interfering object.

U.S. Pat. No. 3,001,038 shows an overhead closure safety halting system utilizing an actuating bar mounted on the leading edge of the garage door to close a switch when interference occurs.

U.S. Pat. No. 3,003,303 illustrates a pneumatic safety edge for power operated doors designed to avoid the use of electrical switches. In this design, pneumatic tubes in the leading edge of the door are compressed upon making contact with an object with a consequent increase in pressure which is transferred to a sensor located away from the door to energize the safety system.

U.S. Pat. No. 3,462,885 discloses a safety edge for a door which employs a pair of electrical conductors mounted in a compressible door edge to make contact upon the edge being compressed by an object.

U.S. Pat. No. 4,115,952 shows a safety door edge which employs a flexible channel along the door edge containing a pair of contacts which come together when the channel is compressed.

U.S. Pat. No. 4,452,009 uses a light barrier and light receivers and sender. In this arrangement, the light exit locations are cleaned each time the door is used.

U.S. Pat. No. 4,773,183 shows a contact sensitive apparatus for a power window or sun roof in which a sealed tube is employed containing a fluid which communicates with a controller to sense an interfering object.

U.S. Pat. No. 4,944,116 describes a sensor strip which acts as a light guide for a light emitter and sensor. When the strip is distorted it interferes with light transmission.

U.S. Pat. No. 4,953,608 discloses a safety device for roll-up doors relying on photoelectric cells.

None of the aforementioned patents teaches or suggests the present invention.

SUMMARY OF THE INVENTION

This invention comprises an improved sensing edge for automatic doors and gates which is resistant to adverse environmental conditions such as dirt, dust, moisture, etc., and is failsafe, that is, if the edge is damaged it can be configured to prohibit motorized operation.

A preferred embodiment of this invention comprises an extruded plastic channel mounted on the leading edge of an automatic door or gate. A light source is mounted within one end of the channel and a photoswitch is mounted in the opposite end of the channel. Electrical conductors are embedded in the extruded plastic material so that all electrical leads are located at one end of the channel where the electronics are well protected from physical damage because they are secured in a rigid housing. An actuator is supported in the channel in a manner which will permit it to block the light beam when the sensing edge makes contact with an object.

One of the advantages of the present invention is that it can be inexpensively manufactured compared to existing designs, and, furthermore, it can be manufactured to standard lengths, then cut and fitted or pieced together in the field. This is an extremely important advantage because door and gate widths come in a tremendous variety of sizes. Existing designs for sensing edges cannot be stocked by distributors because they must be manufactured in specific lengths.

Another feature of this invention is that the light beam does not have to be adjusted because it is locked into adjustment at the time of assembly and cannot be knocked out of adjustment. This is a considerable improvement over existing photo-electric designs for this type of equipment.

As previously noted, the invention requires electrical connection on only one end rather than on both ends as is normally the case with emitter-receiver type photoelectric devices now in use. This is due to the two metal conductors extruded or embedded into the plastic channel that are used to bring power to the light source at one end.

Because the light beam is in a rigid channel, there can be no nuisance tripping of the device due to warps, kinks, or bowing in the flexible tube, as is the case in other designs incorporating a flexible channel. When in use, the invention will also serve as a weather seal on door installation.

It is thus a principal object of this invention to provide a failsafe or self-monitoring sensing edge for automatic doors and gates.

Other objects and advantages of this invention will hereinafter become obvious from the following description of preferred embodiments of this invention.

BRIEF DESCRIPTION OF THE DRAWINGS

FIG. 6 is an end view of another alternative embodiment of the sensing edge.

DESCRIPTION OF THE PREFERRED EMBODIMENTS

Figure 1:
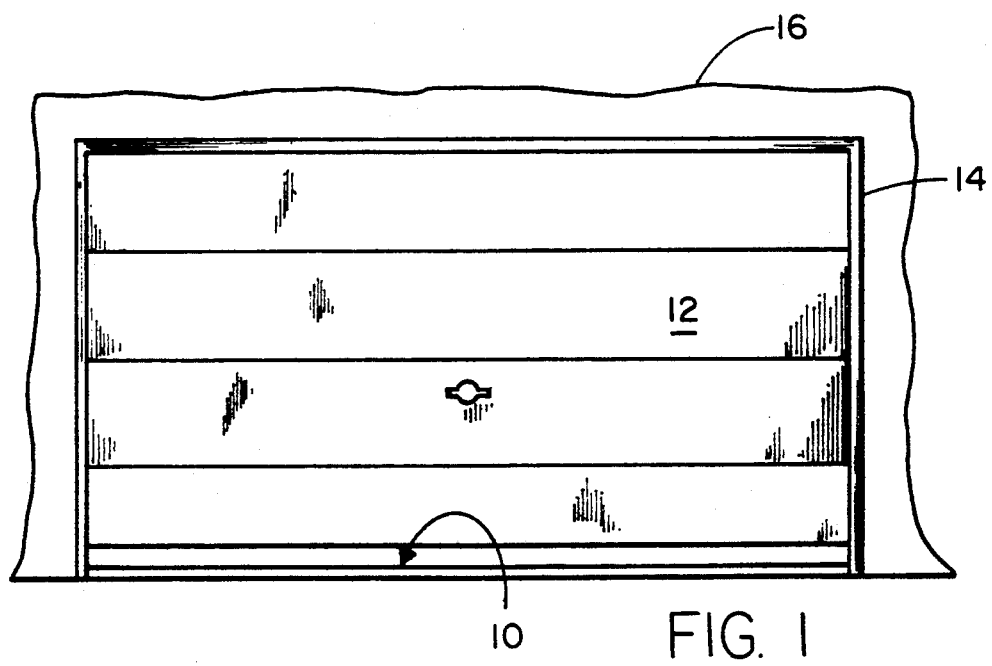
FIG. 1 is a front elevation view showing an overhead door having a sensing edge incorporating a preferred embodiment of the present invention.

Referring to FIG. 1, a sensing edge designated 10 incorporating the principles of this invention is shown mounted along the lower edge of an overhead door 12 located within the doorway 14 of a building 16.

Figure 2:
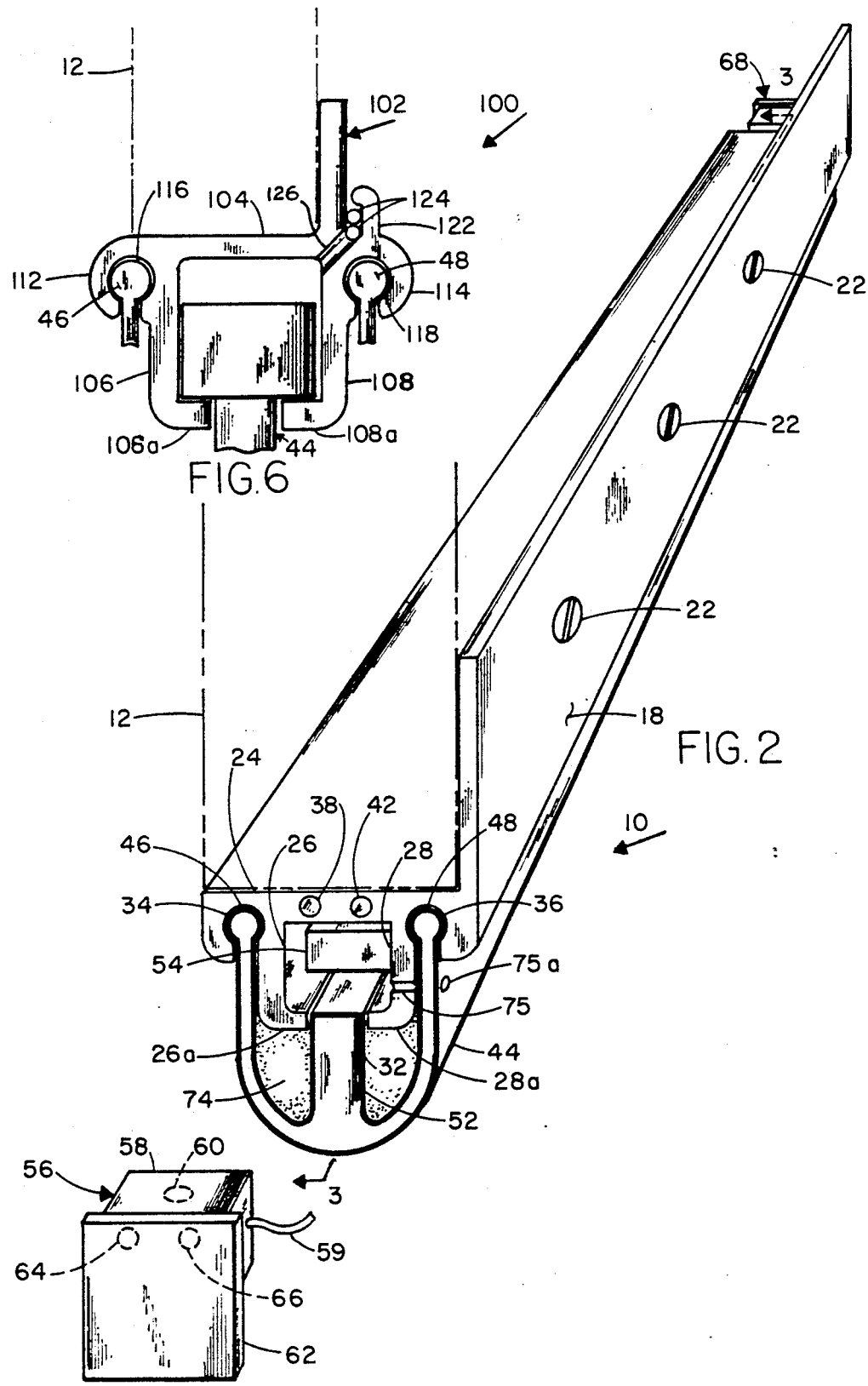
FIG. 2 is a perspective, exploded view of the sensing edge.

As seen in FIG. 2, sensing edge 10 consists of a rigid channel 18 which is L-shaped and may be attached to the bottom of door 12 by any convenient means, such as screws 22.

Channel 18 may be constructed of a rigid plastic material such as a PVC extrusion as is understood in the art. The leg 24 of channel 18 is provided with a pair of downwardly extending arms 26 and 28 with horizontal extensions 26a and 28a forming a slot-like opening 32 extending the length of channel 18. In addition, there are formed a pair of extended pockets 34 and 36 on opposite sides of arms 26 and 28 for a purpose to be described. A pair of metal electrical conductors 38 and 42 are embedded in leg 24 of channel 18 as is illustrated, extending the length of channel 18.

Mounted over legs 26 and 28 of channel 18 is a U-shaped outer covering 44 having its upper arms terminating in swelled edges 46 and 48 which are inserted in pockets 34 and 36, respectively, as illustrated to support outer covering 44 in the manner shown. Outer covering 44 is what is known in the trade as a dual durometer rubber/vinyl extrusion which will readily collapse upwardly when door 12 contacts an obstacle when it is being closed, but having an upwardly extending segment 52 of a rigid, hard rubber which passes through slotted opening 32 and terminates in an actuating member 54 of increased width to fill the space between arms 26 and 28. Segment 52 in the alternative can be cemented to outer covering 44. However, the height of actuating member 54 is such that when outer covering 44 is in its default (unstressed) condition illustrated, that is, not compressed, there is a space between the top of actuating member 54 and the bottom of leg 24 to permit a light beam to travel the length of channel 44.

At one end of channel 44 is mounted a light source assembly 56 consisting of a housing 58 containing the light source 60, either LED or infrared, with a three wire conductor 59 exiting from one side and a plate 62 for mounting on arms 26 and 28 in any suitable fashion. Plate 62 is provided with contacts 64 and 66 to engage conductors 38 and 42, respectively, connected by wiring within housing 58 to supply power to the opposite end of channel 44 where is mounted photoswitch assembly 68 containing a suitable photoswitch 72 and associated electronics.

It will be seen that in this construction light source assembly 56, channel 18 and photoswitch assembly 68 comprise a rigid structure when, once put together properly, require no adjustment is required to line up the light beam and will remain properly aligned while in use.

Figure 3:
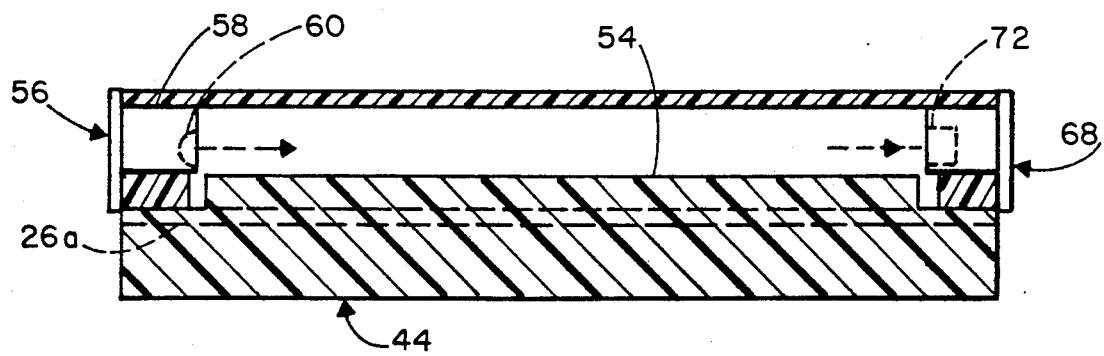
FIG. 3 is a section taken along 3—3 of FIG. 2.

As seen also in FIG. 3, actuating member 54 is shortened at each end so that when outer covering 44 encounters an obstacle, actuating member 54 will clear light source and photoswitch assemblies 56 and 68.

As has already been noted, one end of channel 18 is provided with a light source 60 while the opposite end of channel is provided with a photoswitch 72. When door 12 is in normal use, there will be uninterrupted light from the source to the photoswitch as shown by the arrows. When door 12, while closing, encounters an obstacle, outer covering 44 will be depressed upwardly, forcing actuating member 54 up to block the light, thereby actuating photoswitch 72. As is understood in the art, such actuation may be utilized to deactivate the motor driving door 12, and even to reverse its direction of motion, if desired.

Figure 4:
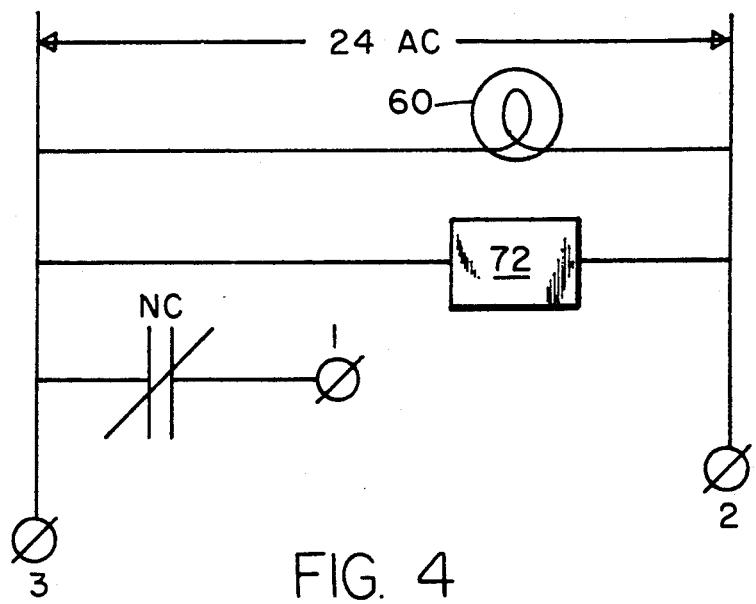
FIG. 4 is a schematic of the circuit for carrying out the purposes of this invention.

While any conventional electrical system may be utilized to carry out this function, one such circuit which can be used is shown in FIG. 4. Light source 60 and photoswitch 72 are energized by a 24 vac source. Contact 1 is connected to the door closing circuit (not shown) of the operator through a normally closed relay NC. Relay NC is kept closed by photoswitch 72 while the latter is receiving a light beam. When photoswitch 72 fails to receive a light beam due either to blocking of the rays by actuator 54, or if the light source fails, relay NC will open. This can be used to turn off a relay (not shown), whose NC contact is connected across the safety-to-open (reverse if closing) operator input. In this way the system becomes failsafe under loss of power or a disconnection from the operator to the sensing edge.

In the installation and operation of sensing edge 10, the device must be installed onto the leading edge of a motorized door or gate 12. This is done by cutting the extruded channel 18, outer covering 44, and extruded actuator 54 to the correct length, inserting actuator 54 into slot 32 of channel 18, and fastening the assembly to the door or gate with screws 22 or other fastening means.

The installer must cut off a piece of the actuator 54 at both ends (approximately 1 inch) to prevent the motion of actuator 54 from being blocked by assemblies 56 and 68 which are inserted into the ends of channel 18 and locked into place. The photoswitch and electronic signal processing circuitry, in addition to making contact with the two metal conductors 38 and 42, will receive electrical power by way of conductor 59 exiting from one side. It will be necessary for the installer to cut a ¼ inch notch 75 in plastic channel 18 and a small hole 75a in the outer covering 44 for the routing of this wire. The output of photo-switch 72 will be connected to the door or gate operator by means of a coiled cord or other similar device. A small junction box can be mounted on the door or vertical edge of channel 18 for connection of the coil cord to the 3-wire conductor. The details of the electrical system do not form a part of this invention. Flexible foam rubber inserts 74, approximately 3 inches long, may be inserted and glued into the open ends of outer covering 44 to keep dirt out of the actuator mechanism.

Whenever moving door or gate 12 strikes an object or person in the path of travel, the light beam is blocked by action of actuator 54 moving into its path and a signal is sent to the operator. This signal can be processed to instruct the motor to reverse the door or gate away from the obstruction.

Figure 5:
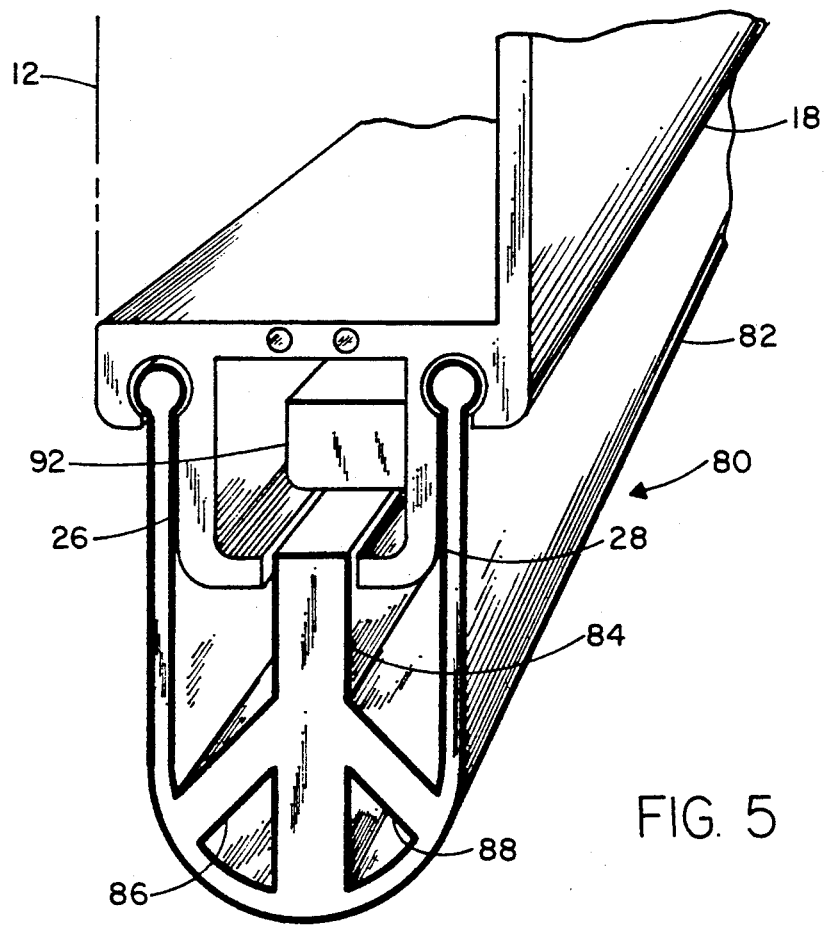
FIG. 5 is a view similar to that of FIG. 2 showing an alternative embodiment of this invention.

Under those circumstances where it is desired to provide greater support for the outer covering, or to cope better with an obstacle encountered at an angle, the arrangement shown in FIG. 5 may be utilized.

Door 12 is provided with a sensing edge 80 comprising an identical L-shaped channel 18 with downwardly extending arms 26 and 28. In this arrangement, outer covering 82 is similar to outer covering 44 except that hard rubber upwardly extending member 84 is provided with a pair of flared extensions 86 and 88, extending the length of outer covering 82 and provides greater resistance to bending should an obstacle be encountered which is angled with respect to door 12. Actuating member 92 is identical to actuating member 54 and functions in the same manner as previously described. Foam rubber end inserts, as previously described, would also be employed to seal the ends of outer covering 82.

Under some circumstances it may not be desirable to have the electrical conductors embedded in the channel so that they can be more readily accessed, and, in addition, to avoid the extra cost of extruding the channel with the conductors embedded therein. Such a configuration is illustrated in FIG. 6 wherein is illustrated door 12 with sensing edge 100.

Sensing edge 100 comprises a rigid channel 102 which is L-shaped and may be attached to the bottom of door 12 by any convenient means, such as screws previously described.

Channel 102 is of rigid plastic construction as previously described with a leg 104 having a pair of downwardly extending arms 106 and 108 with horizontal extensions 106a and 108a. Channel 102 is provided with a pair of circular shoulders 112 and 114 forming pockets 116 and 118 to accomodate swelled edges 46 and 48 of U-shaped outer covering 44 described in greater detail in FIG. 2.

To accomodate the wiring from one end of door 12 to the opposite end is provided a crooked finger member 122 bent inwardly so that the electric conductors 124 can be pressed into the space trapped by finger 122 as illustrated. A notch 126 is formed for passage of the wire. The rest of the structure is identical to that shown in FIG. 2.

The arrangement of FIG. 6 reduces the costs involved in manufacturing the sensing edge as well as providing greater flexibility in the event that additional wiring is necessary or desired.

From the construction described, it is seen that the device is resistant to adverse environmental conditions such as dust, dirt, water, moisture, humidity, and ambient lighting. Because the bottom edge of a garage door is in a very poor environment for electrical or electronic equipment, this is a very important feature. Existing designs for electrical door edges must be sealed and even so they have constant problems with humidity and moisture. Existing designs for photo-electric safety devices also have constant problems with dust, dirt, and ambient lighting.

The present device also is failsafe. If the channel is broken or disturbed, if the power to the light beam or photo-switch is lost, if the electrical cord from the door or gate operator is broken, or if the edge is otherwise damaged, destroyed, or removed, the door or gate control can be easily configured so as to prohibit motorized closing.

In addition, it is seen that the device can be inexpensively manufactured compared to existing designs. Equally important, it can be manufactured to standard lengths, and cut and fitted in the field. This is extremely critical because door and gate widths come in a tremendous variety of sizes. Existing designs for sensing edges cannot be stocked by distributors because they must be manufactured in specific lengths.

Also, the electronics are well protected from physical damage because they are secured in a rigid housing. In addition, the beam does not have to be adjusted because it is locked into adjustment at the time of assembly. These two factors alone are considerable improvements over existing photo-electric designs for this type of equipment.

The device requires electrical connection on only one end rather than on both ends as is normally the case with emitter-receiver type photo-electric devices. This is due to the two metal conductors extruded into the plastic channel that are used to bring power to the light source at one end.

Because the light beam is in a rigid channel, there can be no nuisance tripping of the device due to warps, kinks, or bowing in the flexible tube, as is the case in other designs.

The device provides an added value to the user by serving as a weather seal on door installations.

While only certain preferred embodiments of this invention have been described, it is understood that many variations of this invention are possible without departing from the principles of this invention as defined in the claims which follow.

What is claimed is:

1. A sensing edge for a overhead door or gate having a door edge comprising:
   a. channel means for mounting along the edge of said door or gate, said channel means having a pair of projecting, spaced arms forming a slot-like opening at the free ends thereof for extending the length of said channel means parallel to said door edge;
   b. outer covering means supported on said channel means enclosing said arms, said outer covering means being made out of a flexible material readily depressed when an obstacle is encountered when said door or gate is closing;
   c. member means of rigid material within and mounted on said outer covering means extending through said slot-like opening, said member means terminating in an actuating member between said arms and normally spaced from said door edge;
   d. a light source means mounted on one end of said channel means for directing a light beam down the length of said channel means between said arms and in the space between said actuating member and said channel means when said outer covering means is in its normal, undepressed state, said actuating means blocking said light beam when said outer covering means is depressed by an obstacle in the path of said door or gate when being closed;
   e. photoswitch means mounted on the other end of said channel means for receiving said light beam so that interruption of said light beam will actuate said photoswitch means;
   f. said light source means, channel means and photoswitch means forming a rigid structure whereby said light source means and photoswitch means remain in alignment and do not require adjustment once assembled; and
   g. means sealing the ends of said outer covering means capable of being compressed when said covering means is depressed by an obstacle.

2. The sensing edge of claim 1 wherein said channel means contains embedded conductors extending the length thereof permitting all external connections to said sensing edge to be made from one end of said channel means.

3. The sensing edge of claim 1 wherein said outer covering means including said member means and said actuating member is a dual durometer extrusion.

4. The sensing edge of claim 1 wherein said channel means is L-shaped with one leg for mounting flush against the side of said door or gate and the other leg for mounting flush along said door edge, said arms projecting from said other leg and away from said door edge.

5. The sensing edge of claim 4 wherein said other leg of said channel means is provided with pockets extending the length of said channel means on opposite sides of said arms, said outer covering means having extended swelled edges pressed into said pockets for supporting said outer covering means.

6. The sensing edge of claim 5 wherein circular shoulders form said pockets, at least one of said shoulders shaped protruding outwardly from the surface of said door or gate and having means extending from one of said shoulders for accomodating the insertion and removal of wiring from one side to the other side of said door or gate.

7. The sensing edge of claim 6 wherein said accomodating means comprises a crooked finger for extending parallel to the surface of said door or gate and bent inwardly at the tip thereof to form a space trapping said wiring.

8. The sensing edge of claim 5 wherein the free ends of said spaced, projecting arms bend toward each other forming said slot through which said member means passes.

9. The sensing edge of claim 8 wherein said actuating member is wider than said member means and overlaps the bended portions of said projecting arms.

10. The sensing edge of claim 9 wherein said member means includes leg means to prevent said outer covering means from being depressed at an angle to said projecting arms.

11. The sensing edge of claim 10 wherein said leg means comprises a pair of extended legs flaring out from both sides of said member means to said outer covering means.

* * * * *